E. V. TOWER.
COMPRESSION STRIP.
APPLICATION FILED SEPT. 25, 1918.
1,307,711.
Patented June 24, 1919.
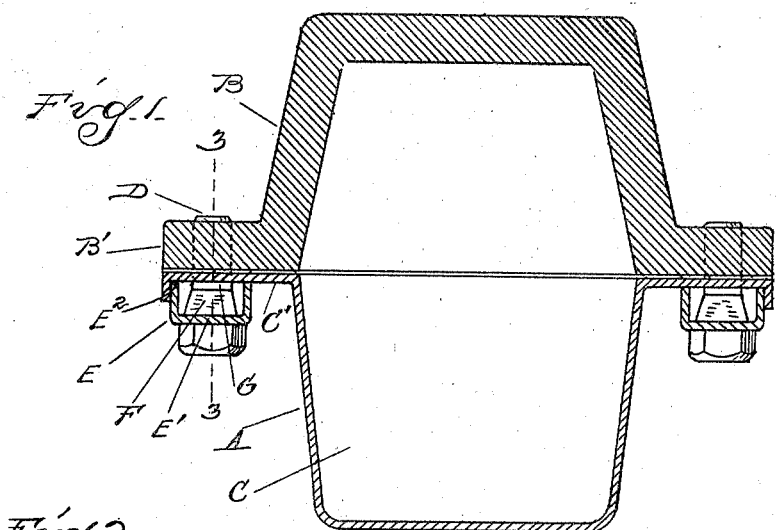
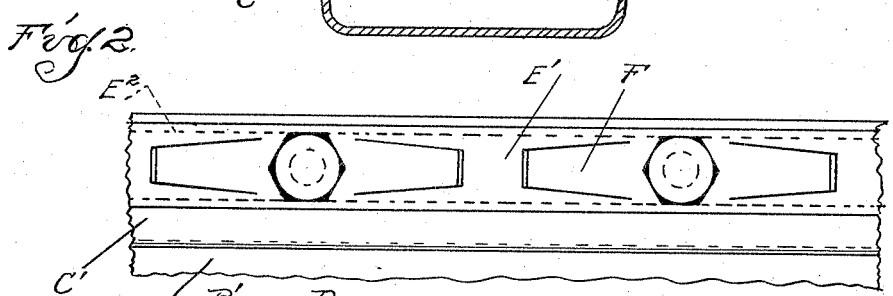
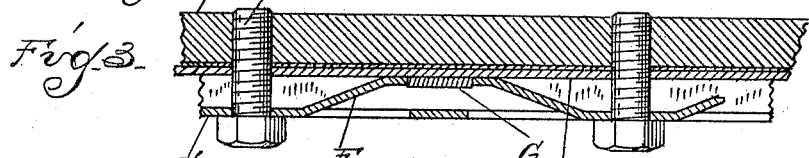
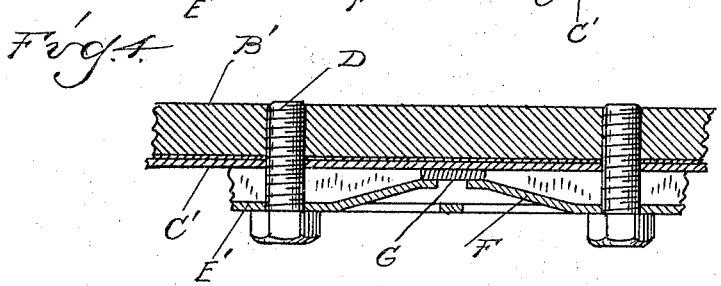
Inventor
Elmer V. Tower
By Whittemore Hulbert & Whittemore
Attorneys

UNITED STATES PATENT OFFICE.

ELMER V. TOWER, OF DETROIT, MICHIGAN.

COMPRESSION-STRIP.

1,307,711. Specification of Letters Patent. Patented June 24, 1919.

Application filed September 25, 1918. Serial No. 255,590.

*To all whom it may concern:*

Be it known that I, ELMER V. TOWER, a citizen of the United States of America, residing at Detroit, in the county of Wayne and State of Michigan, have invented certain new and useful Improvements in Compression-Strips, of which the following is a specification, reference being had therein to the accompanying drawings.

The invention relates to compression strips, which are designed for use in housings containing lubricant or other liquid and more particularly in crank cases. In many instances these housings comprise a plurality of complementary sections, one of which is a casting and the other a stamping. It is highly desirable that the joint between these sections be leak-proof, but heretofore great difficulty has been experienced in securing the sections to each other so that they would be leak-proof, due to the fact that when the bolts securing the sections to each other have been tightened up, the portions of the stamping intermediate the bolts have buckled sufficiently to permit of the escape of the lubricant or other liquid. One of the objects of the invention is the provision of means for overcoming this objectionable feature. Another object of the invention is to provide reinforcing means, which is secured to the section formed of a stamping by the same means that secures the sections to each other. Still other objects of the invention reside in the novel arrangements and combinations of parts as more fully hereinafter set forth.

In the drawings:

Figure 1 is a sectional view of a housing embodying my invention;

Fig. 2 is a bottom plan view of a portion thereof;

Fig. 3 is a cross section on the line 3—3 of Fig. 1;

Fig. 4 is a similar view showing a modified construction.

A is the housing and in the present instance is a crank case. This housing comprises the upper section B, which is a casting, and the lower section C which is a stamping and formed of sheet metal. The sections B and C have the corresponding flanges B' and C' respectively extending around their margins and secured together by means of the bolts D. In constructions as thus far described great difficulty has been experienced in securing these sections to each other so as to be leak-proof. When the bolts have been tightened up, the sheet metal section between the bolts has buckled sufficiently to permit the lubricant to escape.

E is a compression strip, formed of a stamping, which extends entirely around the marginal flange C' of the stamping C. This strip is channel-shaped in cross section and is held in place by means of the bolts D, the heads of which engage the web E' of the channel. The edges $E^2$ of the side flanges of the channel abut against the marginal flange C' of the stamping C and due to the shape and arrangement of the strip, a continuous clamping effect is produced upon the marginal flange C' so that buckling thereof is prevented between the bolts, whereby the joint between the sections will be sealed or made leak-proof throughout its entire extent.

Projections or tongues F are struck inwardly from the web E' of the channel strip E, these projections or tongues abutting against the lug G upon the outer face of the marginal flange C'. As shown in Fig. 3, these projections or tongues abut against the edges of the lug and also bear against the outer face of the marginal flange. Fig. 4 shows these projections as bearing upon the face of the lug. These projections or tongues serve to distribute the bolt pressure to a point intermediate the bolts thereof, further assisting in holding the marginal flange of the stamping in proper sealing contact with the casting.

From the above description it is readily seen that a simple reinforcing construction is provided which will seal the joint between two sections of a housing, one of which is comparatively yieldable. Furthermore, the strip is adaptable to any particular shape of housing and may be used on any present housing of this type without altering the latter in any way. Still another feature is that the strip may be made in sections which abut each other and form in effect a continuous clamping pressure upon the flange of the stamping.

What I claim as my invention is:

1. In a housing, the combination with a section and a second section formed of a stamping and having its marginal portion secured to said first-mentioned section, of flanged reinforcing means bearing against said marginal portion for sealing the joint between said sections throughout substantially its entire extent.

2. In a housing, the combination with a section and a second section formed of a stamping and having a marginal portion secured to said first-mentioned section at spaced points, of a reinforcing strip formed of a stamping, bearing against said marginal portion intermediate said spaced points.

3. In a housing, the combination with a section and a second section formed of a stamping and having its marginal portion in engagement with said first-mentioned section, means for securing said marginal portion and first-mentioned section to each other at spaced points, and a reinforcing stamping for sealing the joint between said sections throughout substantially its entire extent, said stamping secured to said marginal portion by said securing means.

4. In a housing, the combination with a section and a second section formed of a stamping, said sections having marginal flanges in engagement with each other, a channel strip extending along the marginal flange of said second section, and bolts passing through the web of said channel strip and engaging said marginal flanges for clamping said marginal flanges to each other.

5. In a housing, the combination with a section and a second section formed of sheet metal, said sections having marginal flanges in engagement with each other, of a channel strip extending along the marginal flange of said second section and having the edges of its side flanges in engagement therewith, bolts passing through the web of said channel strip and clamping said marginal flanges to each other, and means upon said channel strip for exerting additional pressure upon the marginal flange of said second section intermediate said bolts.

6. In a housing, the combination with a section and a second section formed of sheet metal, said sections having marginal flanges in engagement with each other, of a channel strip extending along the marginal flange of said second section and having the edges of its side flanges in engagement therewith, bolts passing through the web of said channel strip and said marginal flanges, the marginal flange of said second section having lugs or projections thereon intermediate said bolts, and tongues struck in from the web of said channel strip and bearing against said lugs or projections.

7. In a housing, the combination with complementary sections having corresponding flanges extending around their margins, one of said sections being a casting and the other a stamping, of a reinforcing channel-shaped stamping extending along the marginal flange of said stamping section, and bolts engaging the web of said channel-shaped stamping and said marginal flanges for securing the latter to each other, whereby the joint therebetween will be made leak-proof.

8. In a housing, the combination with a section and a second section formed of sheet metal, said sections having marginal flanges in engagement with each other, of a channel strip extending along the marginal flange of said second section and having the edges of its side flanges in engagement therewith, bolts passing through the web of said channel strip and said marginal flanges, and tongues struck in from the web of said channel strip and bearing against the marginal flange of said second section.

In testimony whereof I affix my signature.

ELMER V. TOWER.

Copies of this patent may be obtained for five cents each, by addressing the "Commissioner of Patents, Washington, D. C."